United States Patent [19]

Harris et al.

[11] Patent Number: 5,748,269
[45] Date of Patent: May 5, 1998

[54] ENVIRONMENTALLY-SEALED, CONVECTIVELY-COOLED ACTIVE MATRIX LIQUID CRYSTAL DISPLAY (LCD)

[75] Inventors: David Bennitt Harris, Howard County; Barry Morris Mathieu, Prince Georges County; Jeffrey Alan Dobratz, Montgomery County; Mark Allen Uehling, Prince Georges County; Robert Charles Kull, Montgomery County, all of Md.

[73] Assignee: Westinghouse Air Brake Company, Wilmerding, Pa.

[21] Appl. No.: 754,324

[22] Filed: Nov. 21, 1996

[51] Int. Cl.[6] .................. G02F 1/1335; G02F 1/1333
[52] U.S. Cl. ..................... 349/58; 349/12; 349/161
[58] Field of Search ........................ 349/58, 72, 161, 349/12

[56] References Cited

U.S. PATENT DOCUMENTS

| | | | |
|---|---|---|---|
| 4,575,190 | 3/1986 | Wood et al. | 349/58 |
| 5,170,195 | 12/1992 | Akiyama et al. | 349/161 |
| 5,283,674 | 2/1994 | Hanaoka et al. | 349/58 |
| 5,606,341 | 2/1997 | Aguilera | 349/161 |

FOREIGN PATENT DOCUMENTS

4-62520  2/1992  Japan .................... 349/161

*Primary Examiner*—Anita Pellman Gross
*Attorney, Agent, or Firm*—Whitham, Curtis, Whitham & McGinn

[57] ABSTRACT

A display unit for use with a computer and a power supply, includes an environmentally-sealed enclosure having a removable cover, and housing a liquid crystal display screen, the removable cover serving as an integral heat sink for the power supply, the power supply being mounted on the internal surface of the cover. Further, a backlighting device backlights the display screen, and a cooling plenum conductively and convectively cools the backlighting device, the backlighting device being mounted directly on a surface of the plenum.

20 Claims, 8 Drawing Sheets

ENVIRONMENTALLY-SEALED, CONVECTIVELY-COOLED ACTIVE MATRIX LIQUID CRYSTAL DISPLAY (LCD)

BACKGROUND OF THE INVENTION

The present invention generally relates to a display system, and more particularly to an environmentally-sealed, convectively-cooled liquid crystal display (LCD) unit for use with a computer for operation in severe environments.

DESCRIPTION OF THE RELATED ART

Currently, there is no low cost, environmentally-sealed and permanently mountable display system that may be used in conjunction with commercially-available computers (e.g., the types of computers described in U.S. Pat. No. 5,570,270, incorporated herein by reference, and commercially available from Pulse Electronics, Inc. under the tradename of "Armadillo") to support information and control applications on board a vehicle (e.g., a locomotive) in severe environments. For the purposes of this application, a "severe environment" is defined as one subject to large environmental extremes due to temperature, humidity, radiation, vibration/shock, electromagnetic induction, etc.

Low-cost color display systems are known, but none have been designed to meet daylight readability requirements required in locomotive and other applications while still surviving tough environmental conditions including random vibration, severe temperature extremes, dust, humidity and electromagnetic interference (EMI).

Moreover, the known color display systems expose the display electronics and display backlighting to, for example, dirty locomotive air for cooling. This results in reliability degradation of the conventional displays due to corrosion and electrical intermittence resulting from the contaminants in the cooling air, and as a result does not meet market requirements.

Further, there is no known environmentally-sealed LCD which can be permanently mounted for embedded display control applications. For purposes of this application, an "embedded application" is defined as a specific function(s) which is contained within a larger application and requires no human intervention beyond supplying power to the computer. For example, embedded applications include, but are not limited to, systems and process control, communications, navigation, and surveillance.

SUMMARY OF THE INVENTION

In view of the foregoing problems of the conventional color display systems, it is therefore an object of the present invention to provide an active matrix liquid crystal display (LCD) in an environmentally-sealed enclosure for use with a computer in severe environments and which provides protection from vibration/shock, dust, water, temperature extremes and EMI.

Another object of the present invention is to provide an LCD having thin-film transistors (TFT) and providing a video graphics array (VGA) resolution display.

Yet another object is to provide an environmentally-sealed LCD having a sealed-air plenum design to conductively and convectively cool the display backlighting and system electronics.

Still another object is to provide the environmentally-sealed LCD so as to be permanently mounted for embedded display control applications.

In a first aspect of the present invention, a daylight readable active matrix liquid crystal display (LCD) with a VGA resolution display is housed in an environmentally-sealed enclosure which offers protection from dust, water, temperature extremes and EMI.

More specifically, the inventive display is for use with a computer and a power supply, and includes an environmentally-sealed enclosure, a backlighting device, and a cooling plenum.

The environmentally-sealed enclosure includes a removable cover, and houses a liquid crystal display screen. The removable rear cover serves as an integral heat sink for the power supply, the power supply being mounted on the internal surface of the cover. The backlighting unit backlights the display screen. The cooling plenum is for conductively and convectively cooling the backlighting unit which is mounted directly to a surface of the plenum, while providing the structural stiffness required to protect the bulbs and mounted electronics from damage due to deflections resulting from vibration and shock.

The invention has many novel features including its sealed nature and a sealed air plenum design to conductively and convectively cool the display backlighting and system electronics, which differentiate it from the conventional displays. Preferably, the environmentally-sealed LCD is permanently mounted for embedded display control applications.

With the invention, a more reliable and efficient liquid crystal display unit results which is maximized for use in severe environments.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
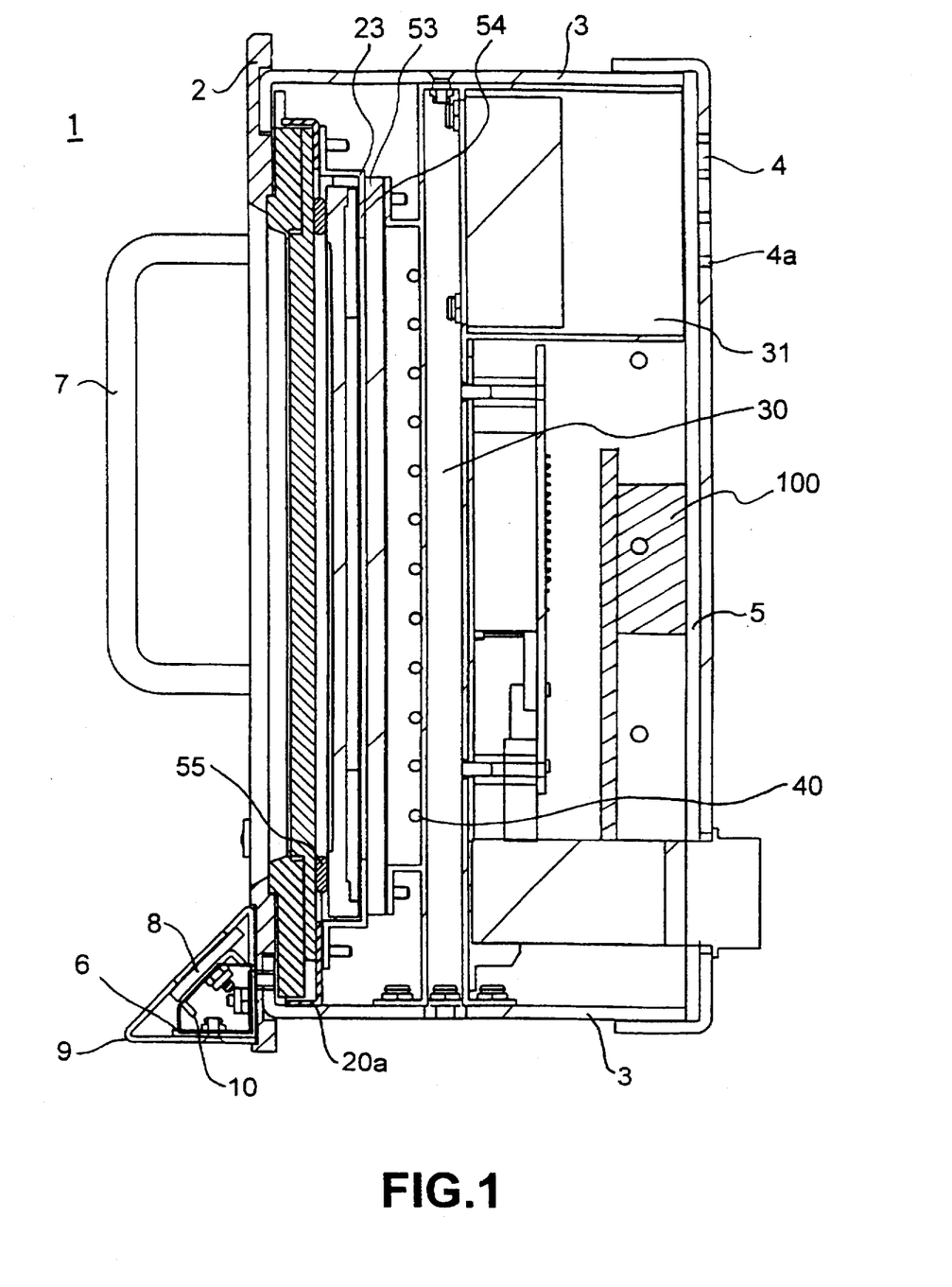
FIG. 1 is a right-side sectional view of a liquid crystal display according to a first embodiment of the present invention.

Referring now to the drawings, and more particularly to FIG. 1, there is shown a first embodiment of a display 1 according to the present invention.

In FIG. 1, the display 1 includes a front face (unreferenced in FIG. 1 but discussed in further detail below), which is preferably rectangular, having a display front bezel 2 for mating with sides of an enclosure 3 of the display. The front bezel 2 forms a periphery for the front face of the display screen which is to be viewed by the operator.

Preferably, the front bezel 2 and enclosure 3 are constructed of metal for durability, and more preferably are constructed, for example, of a combination of 0.25" and 0.125" thick aircraft grade 6061-T6 and 5052-H32 aluminum joined by riveting the back surface of the front bezel 2 and sidewalls together to form the display chassis as shown in FIG. 1. Other candidate materials for the front bezel 2 and enclosure include high-thermal conductivity metals and steels as well as composite materials.

A rear cover 4, preferably formed of aluminum such as that of the front bezel and the enclosure 3 or other highly-thermal conductive metals, is fitted over the sides of the enclosure to provide an enclosure sealed from the environment. Rear cover 4 integrates, for example, a hollow-D fluorosilicone conductive elastomer EMI/dust seal (e.g., gasket) 5, discussed in further detail below in relation to FIG. 5.

The seal 5 may be mounted on an inner wall around the periphery of the rear cover 4 (as well as a plenum described in further detail below). The seal 5 is a field proven conductive fluorosilicone elastomer seal which prevents ingress of moisture, salt, fog, fungus, sand, dust, grease, oil, solvents and the like. The seal's conductive component also provides highly effective EMI shielding properties. An elastomer seal 55 may also be provided as shown in FIG. 1.

For ease in opening and closing the chassis for access to the inner components of the display 1, the rear cover 4 is preferably of a removable shoe-box style in which the rear cover slides over back portions of the sides of the enclosure 3.

The rear cover 4 also acts as an integral heat sink for a power supply 100 (as shown in FIG. 1) which is mounted on the internal surface of the cover 4. Rear cover 4 includes holes 4a for assisting in sinking the heat away from the power supply 100 and the display 1. The high-power dissipation components (of the power supply electronics) are directly thermally conductively-coupled to the rear cover 4 using commercially-available heat transfer enhancing materials such as Berquist Inc.'s "Gap-Pad" material, and thermal greases available from a number of sources including the Wakefield Division of EG&G Corporation and Aavid Engineering Corporation. The materials may be in either film or paste form.

Figure 5:
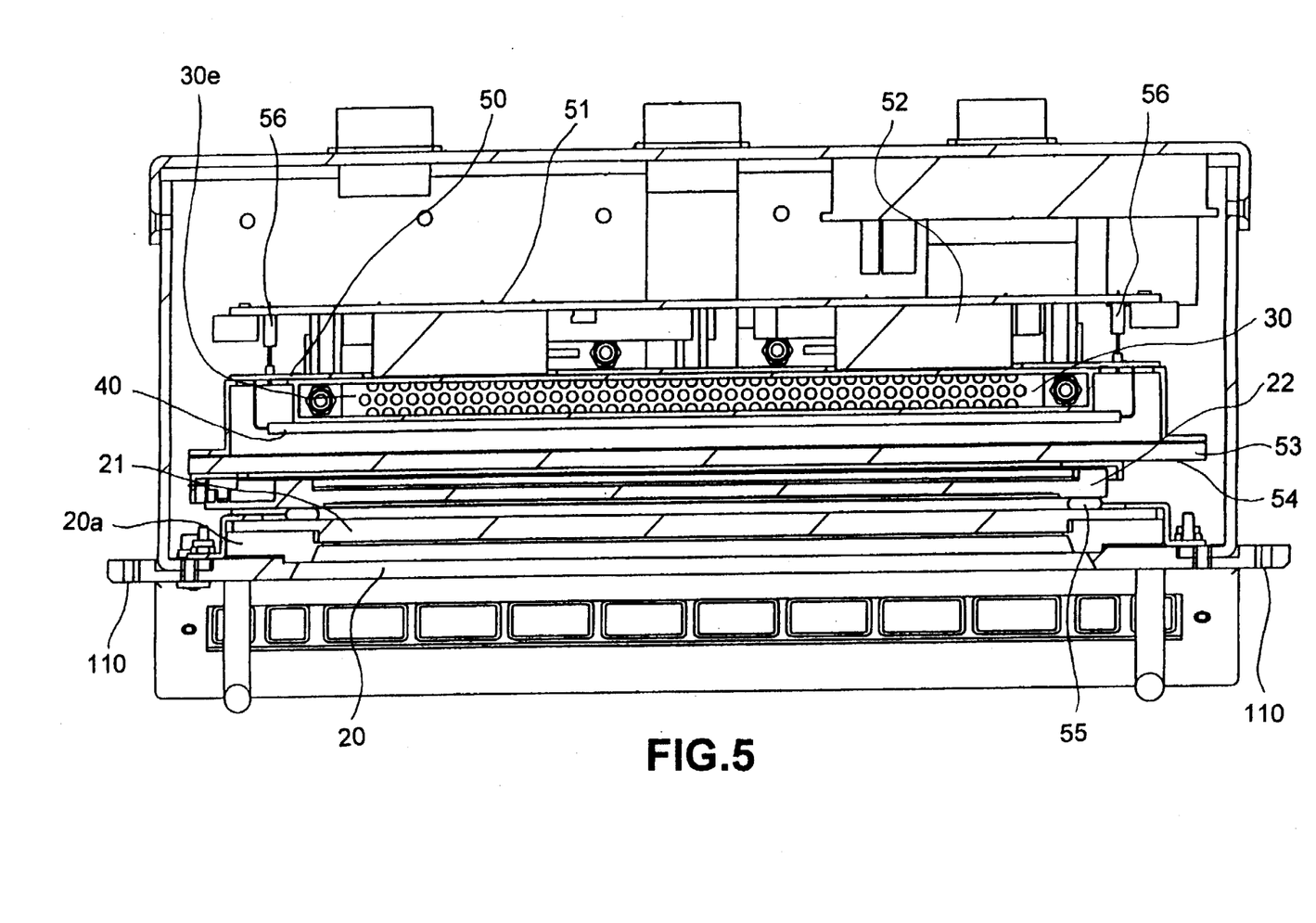
FIG. 5 is a sectional top view illustrating a combination of printed circuit boards (PCBs) 50, 51, and a diffuser 53 with a brightness enhancement film (BEF) 54 used in the display according to the invention.

The front bezel 2 may also be provided with a plurality of L-shaped brackets 6 or the like at its lower end for allowing the mounting of the keypad and bezel assembly. The brackets 6 may be secured to the enclosure by a plurality of fasteners (e.g., screws) shown on the face plate in FIG. 1. The display 1/enclosure 3 arrangement, which is designed for avionics, marine, ground mobile, and weather exposed fixed site applications, is designed to be fixedly mounted on a rack, bulkhead, compartment, etc. For example, the display mounts into a rack or panel by screws threaded through mounting holes 110 (as shown in FIG. 5) of the front bezel 2.

Further, as mentioned above, the front bezel 2, enclosure 3 and rear cover 4 assembly are preferably formed of metal (and even more preferably aluminum) because metal is an excellent conductor of heat. The front bezel, enclosure and rear cover assembly sinks and dissipates the heat directly from the display. Further, the welded metallic shell, together with seals (described in detail below), provides a Faraday cage shield against EMI.

Additionally, while high-strength plastics could conceivably be used, high-conductivity metal is advantageously used instead of plastic material or the like since metal is generally stronger than plastic and can survive cyclic stress in a load-bearing situation much better and more reliably than plastic. Indeed, even the strongest plastics exhibit fatigue cracking when used as load bearing structural members or interfaces to load bearing members.

The display enclosure 3 is preferably built to have a plurality of sizes (e.g., including, but not limited to, approximately 13.66" wide by approximately 10.63" high by approximately 4.73" deep and weighs about 14 pounds. The individual sides and front of the display enclosure, excluding the removable rear cover 4, are riveted or welded together to provide an integral, sealed enclosure. The welded construction provides for a very rigid yet inexpensive (<$120) enclosure with minimized EMI leakage paths.

The display 1 also includes a handle 7 for ease in carrying the display. As is evident to one of ordinary skill in the art, the display 1 includes a power ON/OFF switch, various inputs for power and communication with a processor of the computer, as well as selected actuators for brightness, contrast, etc. according to the designer's requirements.

The inventive structure shown in FIG. 1 also includes a keypad 8 which provides ON/OFF control, function key input and brightness control and is constructed using membrane technology or the like. A bezel 9 is provided for mounting the keypad 8. A keypad stiffener 10 having gussets is provided for preventing the keypad 8 from deflecting/moving during an extreme environment.

Also shown in FIG. 1 (and discussed in further detail below with regard to FIG. 2) are an infrared (IR) touch screen 20, an IR touch screen mounting frame 20a which securely attaches the IR touch screen to the display bezel 2, a commercially-available liquid crystal display (LCD) 22, and an LCD mounting frame 23. Due to irregular mounting holes in the commercial LCD 22, the LCD mounting frame 23 permits mounting of the LCD 22 to the front display bezel 2.

Additionally shown in FIG. 1 (and discussed in further detail below) are a plenum 30, an exhaust port 31, bulbs 40 functioning as a backlighting device, an elastomer seal 55 for sealing the LCD 22 to a diffuser 53 having a brightness enhancement film 54, to ensure that no visible foreign particulates are entrapped therein.

Figure 2:
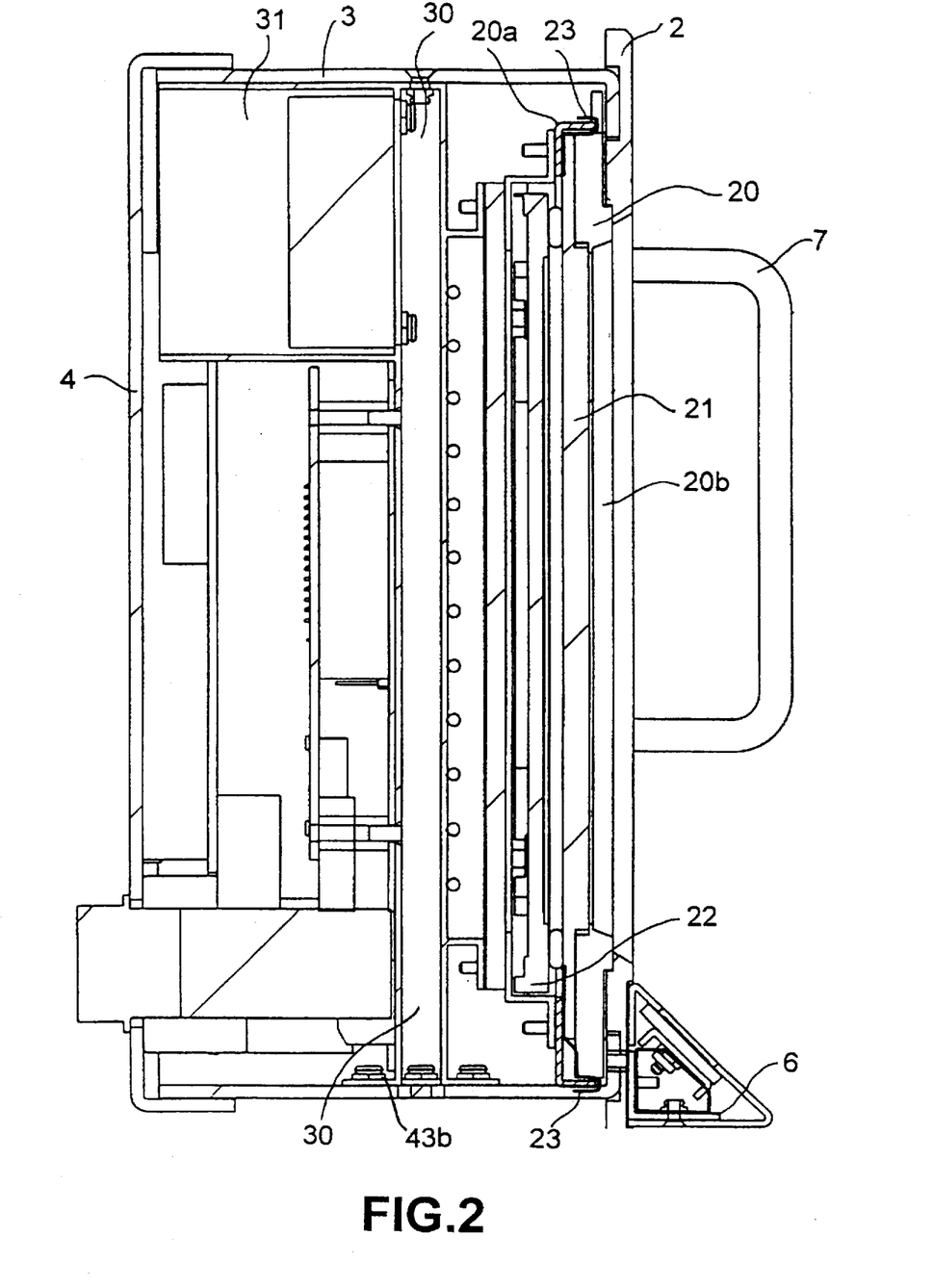
FIG. 2 is a left-side sectional view of the liquid crystal display according to the first embodiment of the present invention shown in FIG. 1.

Turning to FIG. 2, the display I preferably incorporates a custom infrared (IR) touch screen 20 manufactured by Carroll Touch, Inc., which is optionally used for finger or gloved input and which replaces the mouse, and which is mounted by the IR touch screen mounting frame 20a and which includes a bezel 20b. The bezel 20b provides the touch sensing capability, with the IR-LEDs being positioned within the bezel 20b. The touch screen 20 preferably uses an acrylic overlay 21 bonded to the back section of the touch screen frame. The acrylic overlay is preferably 0.25" thick, but may have any thickness so long as the resolution of the display and the sensitivity of the touch screen are not hindered thereby.

The acrylic overlay 21 is electrically conductively coated with an index-matched indium tin oxide (ITO) coating for protection against EMI while minimizing light loss. Specifically, by coating the back side of the overlay 21 with the ITO, light loss is minimized by the index-of-refraction matching of the ITO coating. Index matching is accomplished with a plurality (e.g., two) coatings. The first coating is the ITO and the second is the index-matched optical coating. The index-matched coating and the overlay 21 are commercially available from, for example, Panelview Inc. of Beaverton. It is noted that portions of the ITO must be masked from application of the index-matched coating to allow electrical connection between the ITO surface and the chassis.

The ITO coating's electrical path is completed by sealing the backside of the conductive overlay 21 to the inside surface of the chassis using commercially-tinned copper foil tape 23. The overlay 21 also provides mechanical protection against physical abuse for the LCD 22 which is mounted directly behind the touch screen 20. An EMI seal and gasket 55 are also provided for sealing the LCD 22 from contaminants and the like.

Figure 3:
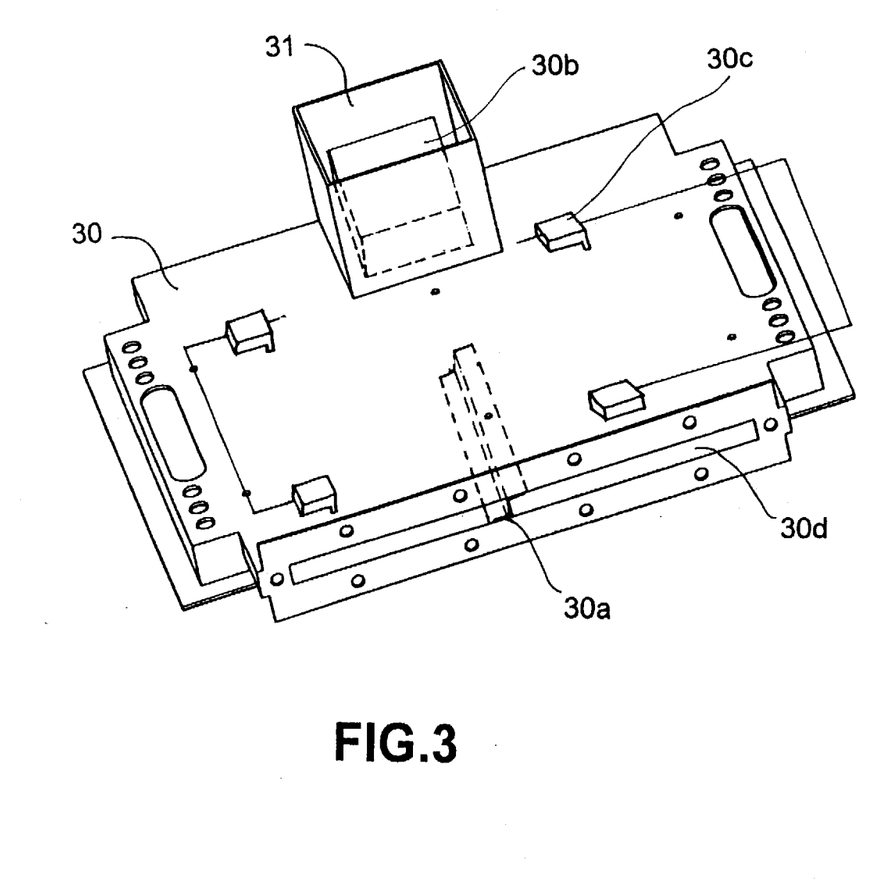
FIG. 3 is a perspective view of a backlight cooling plenum for the display according to FIG. 1.

FIG. 3 shows a perspective view of a backlight cooling plenum 30 for the LCD 22 according to the present invention.

The plenum 30 is mounted to the enclosure top and bottom preferably by screws, and is preferably constructed by welding and riveting, for example, 0.062" aluminum for superior heat transfer performance and includes a hollow channel formed therein for air flow therethrough to an exhaust port 31. Of course, the plenum 30 may be formed of other highly-conductive metals, and may have other thicknesses, according to the designer's requirements and constraints. Associated with the plenum 30 are stiffeners 30a, a fan 30b, and a plurality of resistors 30c, and an air intake passage 30d The air intake passage 30d also is provided as shown in FIG. 3. This intake 30d preferably is fastened (e.g., threaded by screws or the like) to the bottom of the chassis with the gap sealed by an electrically conductive/environmentally sealing gasket. Within the air passage way 30d, the stiffener 30a (preferably constructed of aluminum) is riveted. The plurality of resistors 30c (e.g., four) are fastened (e.g., threaded or fastened by screws) to the plenum 30, to provide heat to bulbs 40 for cold starts. The resistors/heaters 30c are shown in further detail in FIG. 6. The fan 30b is mounted within the exhaust port 31, for evacuating heat, generated by bulbs 40, through the exhaust port 31.

Figure 4A:
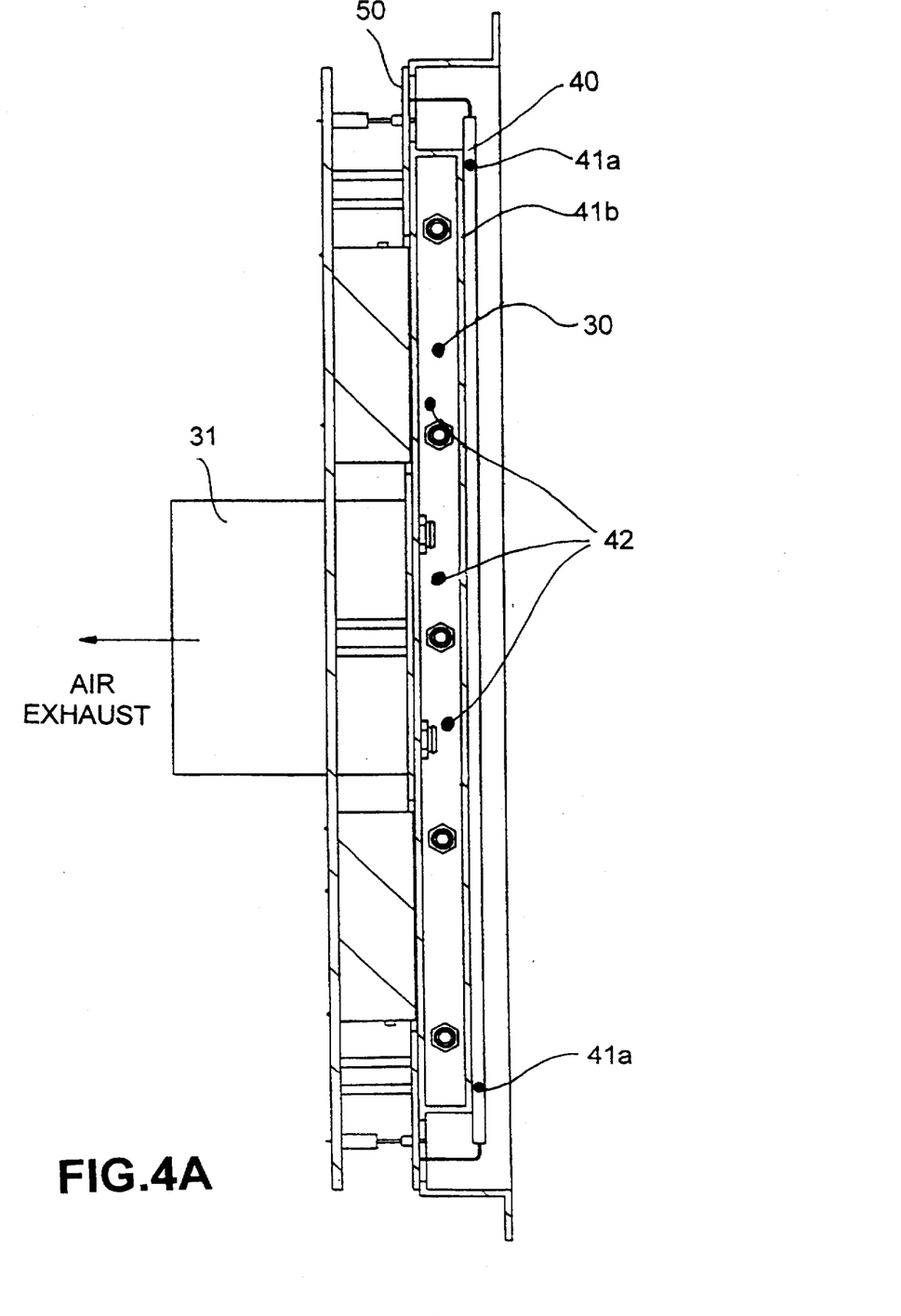
FIG. 4(A) is a cross-sectional (bottom) view of the backlight cooling plenum 30 shown in FIG. 3 and shows backlight fluorescent bulbs 40 directly mounted to a surface of the plenum 30 shown in FIG. 3.

As illustrated in the cross-sectional view of FIG. 4(A) (as well as in FIGS. 1 and 2), a backlighting module is provided which includes a plurality of backlight fluorescent bulbs (e.g., preferably formed of for example, 12 cold cathode fluorescent tubes) 40 for the LCD display 22 are mounted directly (e.g., bonded with adhesive 41a at ends thereof for added security in addition to a commercially-available thermally conductive adhesive 41b) to the surface of the plenum 30 and are powered by the power supply via a display bulb interconnection printed circuit board described in further detail below. The bulbs 40 may have an illumination or power rating according to the designer's needs and constraints and a bulb life of approximately 40,000 hours. The bulbs 40 are commercially available from L.L. Stanley Corporation under the Model No. Of CBY3-250NO. These bulbs are driven at approximately 80% of the manufacturer's recommended drive current in order to increase the estimated life to 40,000 hours, with each bulb drawing 2.4 watts for a total of 29 watts of backlighting. The backlight module also contains a heater for cold starting operation.

The adhesive 41a, 41b is easily removed for repair of individual bulbs 40 and provides a low thermal impedance, conductive cooling path from the bulbs 40 to the inner wall of the plenum 30.

Briefly, to change a bulb, a bulb to be replaced is desoldered from a bulb PC board 50 and the adhesive 41a, 41b is removed/cut with a tool to free the bulb from the plenum 30. Thereafter, a replacement bulb is fitted to the bulb board 50, soldered and adhered to the board 50 with adhesive 41a, 41b.

Heat is created by the bulbs and related structure described above. Accordingly, thermostatically-controlled forced convection cooling is used to dissipate the heat removed from the sealed flow path created by the plenum 30.

Specifically, an electronic two-stage thermal controller is incorporated into PCB 51 and controls the operation of the fan 30b, as well as cuts the backlight power by 50% in the event of a fan failure. This permits display readability and prevents overheating if the fan fails.

If the fan 30b fails, the controller electronics cuts the backlight power by 50%. This still allows the user to see the LCD, but may not provide sufficient brightness for optimum daylight readability (e.g., especially in the path of direct sunlight), but does not completely shutdown the display.

As shown in FIG. 4(A), the air intake passage 30d is a relatively long, rectangular orifice formed along the bottom of the plenum 30. The plenum is mounted such that the passage/orifice 30d is positioned at the bottom of the display enclosure 3 to form a channel. The plenum 30 also includes a plurality of holes 30e (as best shown in FIG. 5) along its bottom. The air enters the plenum 30 through the intake passage/orifice 30d along the bottom of the display enclosure 3, and exits at the air exhaust port 31 of the top of the rear cover 4 as shown in FIG. 4(A) and through holes 4a in the rear cover 4 as best shown in FIG. 1.

Figure 4B:
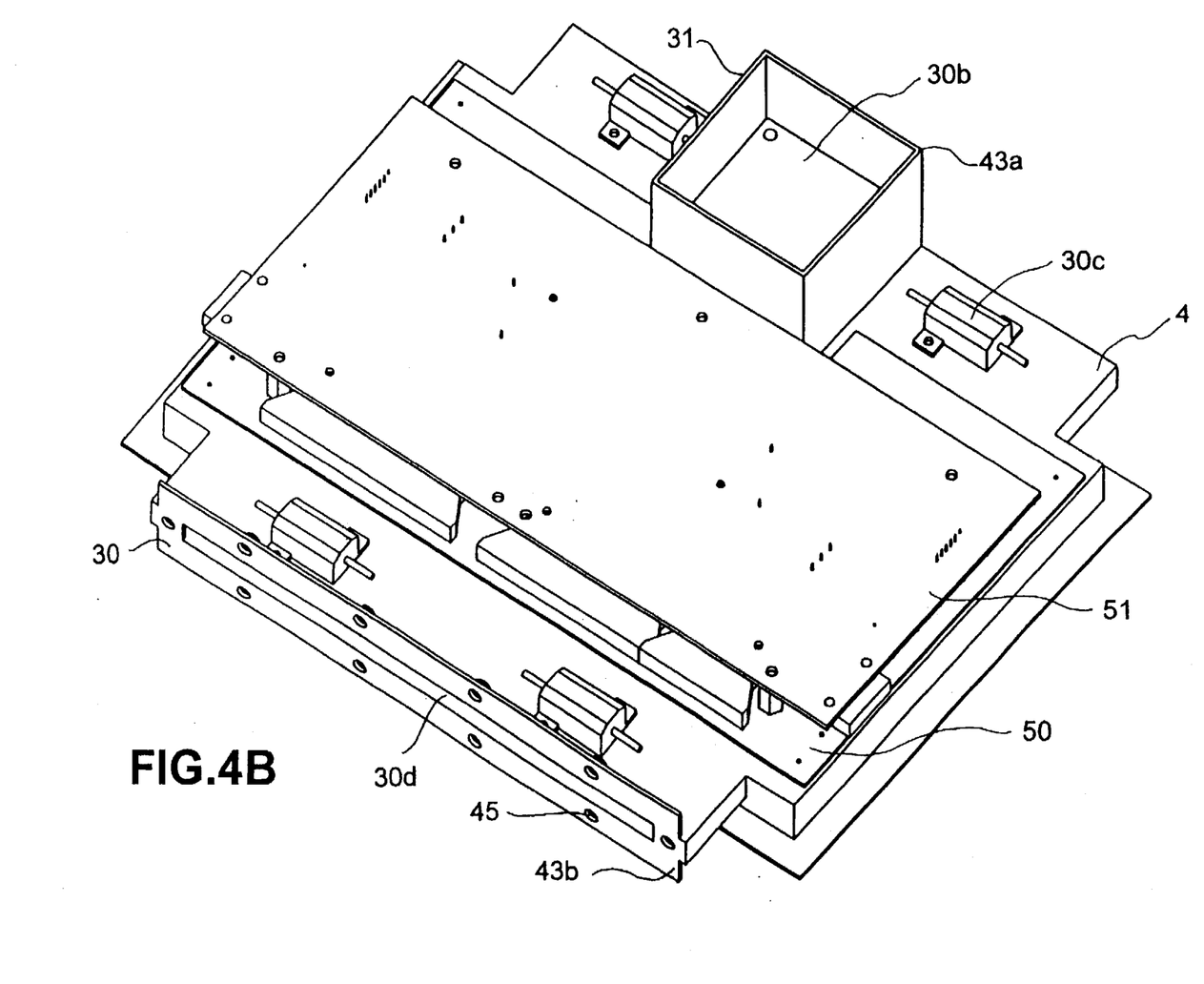
FIG. 4(B) illustrates a perspective view of the backlight cooling plenum with mounted print circuit boards 50 and 51.

EMI/dust seals 43a, 43b, as shown in FIG. 4(B) are included at the interfaces at the exhaust portion 31 and the bottom of the exhaust portion and the rear cover, as well as the interface between the bottom portion of the plenum 30 (e.g., the portion having the passage/orifice 30d) and the bottom of the display enclosure 3. The seals 43a, 43b maintain the environmental integrity of the design. The seals 43a, 43b are manufactured preferably from electrically conductive elastomers such as nickel-plated graphite.

The plenum 30 compresses the seal 43b at the enclosure bottom when the plenum 30 is screwed into position. The seal 43a at the plenum exhaust port 31 is completed when the rear cover 4 is screwed into position as illustrated in FIG. 4(B). As mentioned above, fan 30b is provided for active cooling by forced convection air flow.

Additionally, pressed-on mounting nuts 45 are provided for securing (e.g., threading) plenum 30 to the chassis bottom forming a seal using an EMI gasket/seal 43B as shown in FIG. 2 and 4(A).

As best shown in FIG. 5, a combination of the display bulb interconnection printed circuit board (PCB) 50 and a logic/inverter PCB 51, having a plurality of inverters 52, is mounted on the rear wall of the plenum 30. The two PCBs 50, 51 are electrically interconnected form a stacking board pair assembly, and the assembly is preferably mounted to the plenum 30 with screws. Electrical interconnection is achieved by pin and socket connectors 56, as shown in FIG. 5. Edge connectors, microstrips, etc. may be used for mounting of the PCBs within the stacked pair or to the plenum itself. The design and construction technique of the enclosure 3 limits the PCB deflections (e.g., PCBs 50 and 51) to less than substantially 0.005" given a substantially 2.72 Grms random vibration loading from 10–500 Hz.

The bulb interconnection PCB 50 is for providing the logic and wiring for illuminating the bulbs 40. PCB 50 has openings (e.g., preferably rectangular for fitting the inverters 52 (which are also rectangular), thereby providing a direct thermal path from the inverters 52 of the logic/inverter PCB 51 to the wall of the plenum 30. As shown in FIG. 5, heat dissipated from the inverters 52 is conductively coupled to the inner wall of the plenum 30 to convectively dissipate heat to the plenum air stream.

The logic/inverter module 51 contains two 6-tube DC-to-AC power modules, to power the bulbs/tubes 40 as well as the logic required to drive them. The inverters 52 are designed specifically to drive the fluorescent tubes. This module operates from the 12V provided by the power supply 100. The 5V power required by the logic and the LCD 22 is generated from the 12V from the power supply. Additionally, the inverter module also contains the two-stage thermal shutdown logic to protect the display 1 from excessive-temperature damage (e.g., when the fan 30b shuts down as discussed above or when the heat is over a predetermined temperature as measured by a temperature sensor).

The combined board pair module assembly preferably measures approximately 6" by 10". As mentioned above, the relatively small geometry of the boards, combined with stiffeners (described below), enables the display to reliably operate in a shock and vibration environment of 40g shocks and 2.72 Grms of continuous random vibration from 10–500 Hz.

Thus, the stacked board pair assembly is mounted in the display so as to promote the most efficient possible heat transfer while still maintaining shock and vibration integrity.

A diffuser 53, preferably formed of acrylic #2447, having a commercially available brightness enhancement film (BEF) 54 manufactured, for example, by 3M, Inc. under the tradename of "BEF II 90/50", is mounted between the plenum backlight assembly and the back of the display 1. The BEF 54 is bonded at the perimeter of the diffuser 53 using laminated mastic (manufactured by 3M under Model #F9473PC01001094105 having a static shear strength of approximately 1000 psi. Adhesive is intentionally omitted at the corners of the diffuser 53 to allow the air pressure to equalize between the BEF 54 and the diffuser material 53. This eliminates the formation of trapped air between the BEF 54 and the diffuser material 53 and resulting prismatic distortions of the film 54.

Preferably, the acrylic has two sheets of BEF applied at an orientation of 90° of one another. The laminating mastic bonds the first BEF sheet to the acrylic, and additional mastic bonds the second BEF sheet to the first BEF sheet.

The diffuser 53 provides more even light distribution from the backlight bulbs 40, and the brightness enhancement film 54 increases the directed light output, permitting the bulbs 40 to run at a lower power and thereby decreasing the current required to the bulbs (e.g., to 80% of that required) and increasing the bulb life substantially. This decreases the total power dissipation from the display 1 and extends bulb life to approximately 40,000 hours. Thus, increased system reliability results since all of the electronics will run cooler. As mentioned above, pin and socket connectors 56 are also provided as shown in FIG. 5, as well as holes 100 for accommodating fasteners for rack-mounting the display 1. Further, an elastomer seal 55 seals the LCD 22 to a diffuser 53 having a brightness enhancement film 54, to ensure that no visible foreign particulates are entrapped therein.

Figure 6:
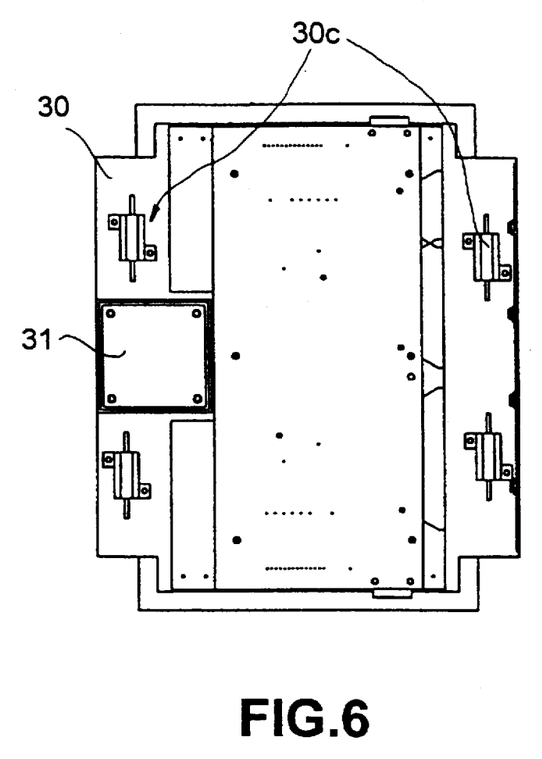
FIG. 6 is a rear view of the display backlight cooling plenum illustrating a plurality of integral heaters (e.g., resistors) 30c mounted to the plenum 30.

As shown in FIG. 6, the plurality (e.g., four) of integral resistors/heaters 30c are mounted to the plenum 30 to warm the display during cold temperatures (e.g., ≈−40° F.). More resistors (or different-size resistors) may be added according to the designer's requirements and constraints and the expected operating environment of the display.

The resistors 30c are coupled to a known temperature sensing device, which may be provided as a chip mounted on the logic/inverter PCB 51 for functioning as a thermostat or the like, such that the resistors 30c are activated (and the fan is deactivated) upon sensing that the ambient temperature and/or temperature of the display 1 has fallen below a predetermined level.

In cold environments, the fan 30b is preferably turned off, and the resistors/heaters 30c heat the plenum 30, and subsequently the bulbs 40, by reversing the heat path ensuring that the fluorescent bulbs 40 will light during cold temperatures. Preferably, the heaters 30c have a minimum power rating of 40 watts, and the bulbs are maintained in a temperature range of optimally between −40° C. to +70° C.

For example, special parts, as provided by various component suppliers, may be provided to allow extended operation in a wide ambient temperature range of substantially −40° C. to +65° C.

Figure 7:
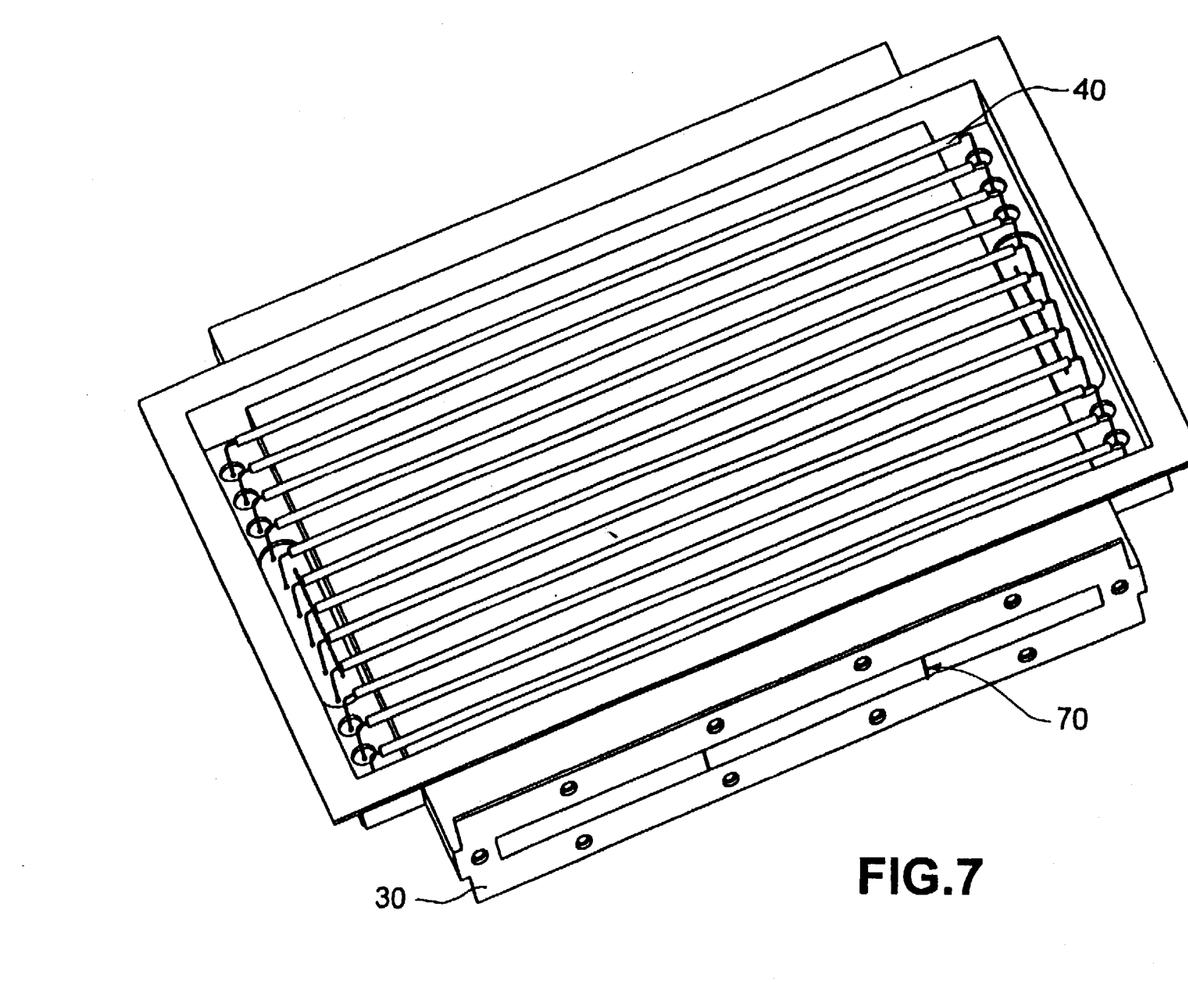
FIG. 7 is a perspective view of the backlight cooling plenum 30 having integral stiffeners 70.

Referring to FIG. 7, a perspective view of the backlight device of the present invention is shown in which integral stiffeners 70, preferably formed of aluminum, are employed in the plenum 30 for limiting bulb deflection during shock and vibration. Specifically, the integral stiffeners 70 are mounted between walls of the plenum 30, and are for preventing excessive deflections of the plenum-mounted bulbs 40 when subjected to random vibration environments.

With the invention, an active matrix liquid crystal display (LCD) according to the present invention is provided with an environmentally sealed-enclosure for use with a computer in severe environments and which offers protection from dust, water, temperature extremes and EMI. The LCD is formed of thin-film transistors (TFT) and provides a VGA resolution display.

Further, the environmentally-sealed LCD according to the invention includes a sealed-air plenum design to conductively and convectively cool the display backlight and system electronics. Further, the inventive LCD can be permanently mounted for embedded display control applications.

With its sealed nature and sealed air plenum design to conductively and convectively cool the display backlight and system electronics, the display according to the present invention is much more reliable and has a much greater utility than conventional display units.

For example, the device design of the present invention has been certified in a number of different tests to measure its survivability and performance criteria. In exemplary tests to qualify the device for vibration, shock, extreme temperature, humid and dusty environments, the following specifications have been met:

TEST TYPE

A) Sinusoidal Vibration- 7.6 mm p-p 5–10 Hz; 1.5 g, 10–300 Hz per MIL-STD-810E, Method 514.4 Combined ATCS and GE Levels B) Sinusoidal Vibration 2.19 Gmax at 15 Hz to 1.46 Gmax at 36 Hz, per SPEC. 198-EMD Performance Specification Issued 4.23.73. Dwell for 8 hours at the resonant point.

C) Random Vibration-ATCS Rail 2.72 Grms, 10–500 Hz per MIL-STD-810E, Method 514.4, Proc. I Combined ATCS and GE Levels D) Operating Shock 20g, 11 ms, terminal peak per MIL-STD-810E, Method 516.4 Proc. 1, 3 shocks/axis in all 3 axes.

E) Non-Operating Shock 40 g, 11 ms, terminal peak per MILSTD-810E, Method 516.4 Proc. 1, 3 shocks/axis in all 3 axes.

F) Operating Shock 10 g, 15 ms, half-sine per MIL-STD-810E, Method 516.4 Proc. 1, 3 shocks/axis in all 3 axes.

G) High Temperature Storage @ 85° C., per MIL-STD-810E, Method 501.3, Category A1, Proc. 1, 7 days.

H) High Temperature Operational @65° C., per MIL-STD-810E, Method 501.3, Category A1, Proc. 2, 7 days.

I) Low Temperature Storage @–55° C., per MIL-STD-810E, Method 502.3, Category C2, Proc. 1, 7 days.

J) Low Temperature Operational @–40° C., per MIL-STD-810E, Method 502.3, Category C2, Proc. 2, 7 days.

K) Temperature Cycle, –40° C. to 65° C., per MIL-STD-810E, Method 503.3, Category A1 & C2, 100 cycles, operational.

L) Dust, per MIL-STD-810E, Method 510.3, Blowing Dust, 12 hours.

M) Induced Humidity, 40° C. & 95% RH, per MIL-STD-810E, Method 507.3, Proc. 2, 24 hr. cycle, 10 days.

While the invention has been described in terms of a single preferred embodiment, those skilled in the art will recognize that the invention can be practiced with modification within the spirit and scope of the appended claims.

For example, the communication screen device of the present invention may be integrated with the Pulse Armadillo processor, I/O and memory boards, to create an integrated display and computer product.

Another modification to the invention is to eliminate the IR touch screen or to substitute therefor a different touch technology or input device.

Having thus described our invention, what we claim as new and desire to secure by letters patent is as follows:

1. A display unit for use with a computer and a power supply, comprising:

an environmentally-sealed enclosure having a removable cover, and housing a liquid crystal display screen, said removable cover serving as an integral heat sink for said power supply, the power supply being mounted on the internal surface of the cover;

backlighting means for backlighting said display screen; and a cooling plenum for conductively and convectively cooling the backlighting means, said backlighting means being mounted directly on a surface of said plenum.

2. A display unit according to claim 1, wherein said display screen comprises:

a touch screen; and an overlay bonded to a surface of said touch screen.

3. A display unit according to claim 2, wherein said overlay comprises an acrylic overlay which is electrically conductively coated with an indium-tin-oxide (ITO) coating.

4. A display unit according to claim 3, wherein said display screen further comprises a touch screen frame for housing said touch screen, and wherein a side of said overlay opposite said display screen is sealed to an inner surface of said enclosure by copper foil tape.

5. A display unit according to claim 3, wherein said liquid crystal display screen is mounted directly behind said touch screen.

6. A display unit according to claim 3, wherein said plenum is formed of aluminum.

7. A display unit according to claim 1, wherein a thermally conductive adhesive is positioned between said plenum and said backlighting means for mounting said backlighting means on said plenum, said adhesive being removable and providing a conductive cooling path from said backlighting means to an inner wall of said plenum.

8. A display unit according to claim 1, wherein said plenum creates a sealed air flow path, said display further comprising means for providing forced convection cooling for dissipating heat removed from said sealed flow path created by said plenum.

9. A display unit according to claim 1, wherein said removable cover serves as an integral heat sink for the power supply, said power supply being directly conductively-coupled to the removable cover via one of a film and a paste.

10. A display unit according to claim 1, further comprising a front bezel for sealing said display screen within said enclosure, wherein each of said front bezel, said enclosure, and said plenum is constructed of aluminum.

11. A display unit according to claim 1, further comprising means for adjusting a temperature of said display unit, means for determining a temperature of said display unit and a multi-stage thermal controller coupled to said temperature adjusting means to selectively adjust a power of said backlighting means when a temperature of said display unit reaches a predetermined level.

12. A display unit according to claim 11, wherein said temperature adjusting means comprises a heater.

13. A display unit according to claim 11, wherein said temperature adjusting means comprises a fan.

14. A display unit according to claim 1, wherein a rectangular orifice is formed at a predetermined position of a bottom of the enclosure to form a channel, and wherein air enters said plenum through the orifice and exits at an air exhaust portion of the removable cover.

15. A display unit according to claim 1, further comprising first and second seals for sealing said enclosure from electromagnetic induction and contaminants, said seals comprising electrically conductive elastomers, wherein said plenum compresses said first seal at the enclosure bottom when said plenum is coupled to said enclosure, and wherein said second seal is compressed at a plenum exhaust portion when the removable cover is coupled to said enclosure.

16. A display unit according to claim 1, further comprising a printed board stacked pair assembly comprising a display bulb interconnection printed circuit board and a logic/inverter printed circuit board, said logic/inverter printed circuit having a plurality of inverters and being mounted on a wall of said plenum, wherein said bulb interconnection printed circuit board includes openings for fitting the inverters therein, to thereby provide a direct thermal path from said plurality of inverters of said logic/inverter printed circuit board to the wall of said plenum, wherein heat dissipated from the inverters is conductively coupled to an inner wall of said plenum to convectively dissipate heat to an airstream of said plenum.

17. A display unit according to claim 1, further comprising a diffuser having a brightness enhancement film (BEF) mounted between said backlighting means and said liquid crystal display screen, wherein said BEF is bonded at a perimeter of said diffuser by an adhesive, such that an air pressure equalizes between the BEF and said diffuser, to thereby eliminate formation of trapped air between the BEF and said diffuser, said diffuser including means for distributing light from said backlighting means and said BEF to thereby form a directed light output.

18. A display unit according to claim 1, further comprising:
   means for cooling said backlighting means; and
   a heater mounted to said plenum for heating said display screen;
   means, coupled to said heater, for sensing a temperature of said display, and for actuating said heater when said temperature falls below a predetermined temperature; and
   means for turning off said cooling means when said temperature falls below said predetermined temperature.

19. A display unit according to claim 1, wherein said plenum includes first and second walls, and a stiffener mounted between said first and second walls for damping vibrations of said plenum and preventing deflections of said backlighting means when said display unit is subjected to random vibration and mechanical shock environments.

20. An integrated computer system including:
   a power supply;
   a display unit powered by said power supply, said display unit comprising:
      an environmentally-sealed enclosure having a removable cover, and housing a liquid crystal display screen, said removable cover serving as an integral heat sink for said power supply, the power supply being mounted on the internal surface of the cover;
      backlighting means for backlighting said display screen; and
      a cooling plenum for conductively and convectively cooling the backlighting means, said backlighting means being mounted directly on a surface of said plenum.

* * * * *